United States Patent [19]

Suzuki

[11] Patent Number: 5,801,841
[45] Date of Patent: Sep. 1, 1998

[54] IMAGE SIGNAL CODING APPARATUS WITH SWITCHING BETWEEN VARIABLE-LENGTH CODING AND FIXED-LENGTH CODING

[75] Inventor: Kazuhiro Suzuki, Kanagawa, Japan

[73] Assignee: Fuji Xerox Co., Ltd., Tokyo, Japan

[21] Appl. No.: 417,251

[22] Filed: Apr. 5, 1995

[30] Foreign Application Priority Data

Oct. 18, 1994 [JP] Japan .................................. 6-252220

[51] Int. Cl.⁶ .................................................. H04N 1/415
[52] U.S. Cl. ...................... 358/433; 358/261.1; 382/232; 382/246
[58] Field of Search ............................ 358/433, 426, 358/261.1, 261.2, 261.3, 261.4, 427; 382/232, 233, 234, 235, 236, 245, 246, 248, 251; 248/18, 27, 397, 395

[56] References Cited

U.S. PATENT DOCUMENTS

| | | | |
|---|---|---|---|
| 3,675,211 | 7/1972 | Raviv | 340/172.5 |
| 3,701,108 | 10/1972 | Loh et al. | 340/172.5 |
| 4,509,038 | 4/1985 | Hirano | 340/347 |
| 5,136,290 | 8/1992 | Bond et al. | 341/67 |
| 5,138,316 | 8/1992 | Konishi | 341/67 |
| 5,166,987 | 11/1992 | Kageyama | 382/238 |
| 5,291,303 | 3/1994 | Ishikawa | 358/426 |
| 5,404,139 | 4/1995 | Bhandari | 341/81 |
| 5,412,484 | 5/1995 | Yoshikawa | 358/433 |
| 5,440,345 | 8/1995 | Shimoda | 348/411 |
| 5,469,273 | 11/1995 | Demura | 358/426 |

FOREIGN PATENT DOCUMENTS 0 493 130 A3  7/1992  European Pat. Off. .

| | | |
|---|---|---|
| 63-306768 | 12/1988 | Japan . |
| 83104065 | 11/1994 | Taiwan . |
| 82110949 | 1/1995 | Taiwan . |

OTHER PUBLICATIONS

Patent Abstracts of Japan, Kokai No. 6-153172, vol. 18, No. 470, Aug. 31, 1994.

Gotoh et al., "A Compression Algorithm for Medical Images and a Display with the Decoding Function," Systems and Computer in Japan, vol. 22, No. 2, 1991.

"The JPEG Still Picture compression Standard" Gregory K. Wallace et al. pp. 1–17, Submitted Dec. 1991 for publication in IEEE Transctions on Consumer Electronics.

Primary Examiner—Edward L. Coles, Sr.
Assistant Examiner—Madeleine A V Nguyen
Attorney, Agent, or Firm—Finnegan, Henderson, Farabow, Garrett & Dunner, L.L.P.

[57] ABSTRACT

A pixel block is coded by both of a quadrature transform coding section and a block truncation coding section. A code amount counter determines a first code amount of one-block coded data produced by the quadrature transform coding section. A code amount judgment section compares the first code amount with a threshold that is smaller than or equal to a second code amount of one-block coded data produced by the block truncation coding section, and produces discrimination information indicating a comparison result. A selector selects the coded data that is output from the quadrature transform coding section if the first code amount is smaller than the threshold, and selects the coded data that is output from the block truncation coding section if the first code amount is larger than the threshold. A storage section stores the discrimination information for each pixel block and the coded data that is output from the selector and corresponds to the discrimination information.

7 Claims, 13 Drawing Sheets

FIG. 3(a)
PIXEL BLOCK

| | | | | | | | |
|---|---|---|---|---|---|---|---|
| 169 | 167 | 169 | 168 | 163 | 160 | 156 | 152 |
| 168 | 169 | 168 | 168 | 163 | 161 | 162 | 157 |
| 166 | 168 | 167 | 161 | 158 | 161 | 158 | 158 |
| 167 | 164 | 164 | 161 | 160 | 158 | 158 | 157 |
| 166 | 161 | 160 | 161 | 159 | 158 | 158 | 155 |
| 161 | 161 | 159 | 159 | 164 | 158 | 158 | 155 |
| 158 | 156 | 157 | 156 | 157 | 158 | 156 | 154 |
| 154 | 152 | 154 | 150 | 150 | 150 | 150 | 148 |

FIG. 3(b)
TRANSFORM COEFFICIENTS

| | | | | | | | |
|---|---|---|---|---|---|---|---|
| 253 | 23 | -3 | 2 | -2 | 3 | 0 | 2 |
| 29 | 11 | -2 | -3 | -1 | 1 | 0 | -2 |
| -9 | 2 | -4 | -1 | -1 | 1 | 1 | 0 |
| 7 | 0 | -5 | 3 | 3 | 0 | -2 | 1 |
| -8 | 4 | 0 | 0 | 2 | 2 | 1 | 0 |
| 1 | 0 | 0 | 0 | 0 | -1 | 2 | 0 |
| -3 | 2 | 0 | 0 | -1 | -3 | 1 | 1 |
| -2 | 0 | 1 | 0 | -1 | 1 | 2 | -2 |

FIG. 3(c)
QUANTIZATION MATRIX

| | | | | | | | |
|---|---|---|---|---|---|---|---|
| 16 | 11 | 10 | 16 | 24 | 40 | 51 | 61 |
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 3(d)
QUANIZED COEFFICIENTS

| | | | | | | | |
|---|---|---|---|---|---|---|---|
| 16 | 2 | 0 | 0 | 0 | 0 | 0 | 0 |
| 2 | 1 | 0 | 0 | 0 | 0 | 0 | 0 |
| -1 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3(e)
INVERSELY QUANTIZED COEFFICIENTS

| | | | | | | | |
|---|---|---|---|---|---|---|---|
| 256 | 22 | 0 | 0 | 0 | 0 | 0 | 0 |
| 24 | 12 | 0 | 0 | 0 | 0 | 0 | 0 |
| -14 | 0 | 0 | 0 | 0 | 0 | 0 | 0 |
| 14 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG. 3(f)
DECODED PIXEL BLOCK

| | | | | | | | |
|---|---|---|---|---|---|---|---|
| 171 | 170 | 168 | 165 | 163 | 160 | 158 | 157 |
| 168 | 167 | 166 | 163 | 161 | 159 | 157 | 156 |
| 166 | 165 | 164 | 162 | 160 | 158 | 156 | 155 |
| 166 | 165 | 164 | 163 | 161 | 159 | 158 | 157 |
| 166 | 166 | 165 | 163 | 162 | 161 | 160 | 160 |
| 163 | 163 | 162 | 161 | 161 | 160 | 159 | 159 |
| 157 | 157 | 157 | 156 | 156 | 155 | 155 | 155 |
| 152 | 152 | 152 | 152 | 151 | 151 | 151 | 151 |

DC COMPONENT
FREQUENCY COMPONENTS IN HORIZONTAL DIRECTION
LOW ——→ HIGH
FREQUENCY COMPONENTS IN VERTICAL DIRECTION

TRANSFORM COEFFICIENTS

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 6

| GROUP NO. | DIFFERENCE OF DC COMPONENT | NUMBER OF ADDITIONAL BITS |
|---|---|---|
| 0 | 0 | 0 |
| 1 | -1, 1 | 1 |
| 2 | -3, -2, 2, 3 | 2 |
| 3 | -7 ··, -4, 4, ·· 7 | 3 |
| 4 | -15·· -8, 8 ··15 | 4 |
| 5 | -31·· -16, 16 ··31 | 5 |
| 6 | -63·· -32, 32 ··63 | 6 |
| 7 | -127·· -64, 64 ··127 | 7 |
| 8 | -255·· -128, 128 ··255 | 8 |
| 9 | -511·· -256, 256 ··511 | 9 |
| 10 | -1023·· -512, 512 ··1023 | 10 |
| 11 | -2047·· -1024, 1024 ··2047 | 11 |
| 12 | -4095·· -2048, 2048 ··4095 | 12 |
| 13 | -8091·· -4096, 4096 ··8091 | 13 |
| 14 | -16383·· -8092, 8092 ··16383 | 14 |
| 15 | -32767·· -16384, 16384 ··32767 | 15 |

FIG. 7

(SIZE)
- (0)  00
- (1)  010
- (2)  011
- (3)  100
- (4)  101
- (5)  110
- (6)  1110
- (7)  11110
- (8)  111110
- (9)  1111110
- (10) 11111110
- (11) 111111110

FIG. 8

| GROUP NO. | AC COMPONENTS | NUMBER OF ADDITIONAL BITS |
|---|---|---|
| 1 | -1, 1 | 1 |
| 2 | -3, -2, 2, 3 | 2 |
| 3 | -7 ⋯, -4, 4, ⋯ 7 | 3 |
| 4 | -15⋯ -8, 8 ⋯15 | 4 |
| 5 | -31⋯ -16, 16 ⋯31 | 5 |
| 6 | -63⋯ -32, 32 ⋯63 | 6 |
| 7 | -127⋯ -64, 64 ⋯127 | 7 |
| 8 | -255⋯ -128, 128 ⋯255 | 8 |
| 9 | -511⋯ -256, 256 ⋯511 | 9 |
| 10 | -1023⋯ -512, 512 ⋯1023 | 10 |
| 11 | -2047⋯ -1024, 1024 ⋯2047 | 11 |
| 12 | -4095⋯ -2048, 2048 ⋯4095 | 12 |
| 13 | -8091⋯ -4096, 4096 ⋯8091 | 13 |
| 14 | -16383⋯ -8092, 8092 ⋯16383 | 14 |
| 15 | -32767⋯ -16384, 16384 ⋯32767 | 15 |

FIG. 9

| RUN \ SIZE | 0 | 1 | 2 | ⋯ | 15 |
|---|---|---|---|---|---|
| 0 | (0, 0) | (0, 1) | (0, 2) | ⋯ | (0, 15) |
| 1 | (1, 0) | (1, 1) | | | |
| 2 | (2, 0) | CODING SYMBOL DETERMINED BY COMBINATION OF NNNN AND SSSS | | | |
| ⋮ | ⋮ | | | | |
| 15 | (15, 0) | ⋯ | | | (15, 15) |

SUN : GROUP NO. OF EFFECTIVE COEFFICIENT
RUN : RUN (0-15) OF INEFFECTIVE COEFFICIENTS

WHERE
(0, 0) : EOB (BLOCK TERMINATION CODE)
(0, 15) : ZRL (ZERO-RUN OF 16)

FIG. 10

(RUN/SIZE)

| | | | |
|---|---|---|---|
| (0, 0) | 1010 | (2, 9) | 1111111110001101 |
| (0, 1) | 00 | (2, 10) | 1111111110001110 |
| (0, 2) | 01 | (3, 1) | 111010 |
| (0, 3) | 100 | (3, 2) | 111110111 |
| (0, 4) | 1011 | (3, 3) | 111111110101 |
| (0, 5) | 11010 | (3, 4) | 1111111110001111 |
| (0, 6) | 1111000 | (3, 5) | 1111111110010000 |
| (0, 7) | 11111000 | (3, 6) | 1111111110010001 |
| (0, 8) | 1111110110 | (3, 7) | 1111111110010010 |
| (0, 9) | 1111111110000010 | (3, 8) | 1111111110010011 |
| (0, 10) | 1111111110000011 | (3, 9) | 1111111110010100 |
| (1, 1) | 1100 | (3, 10) | 1111111110010101 |
| (1, 2) | 11011 | (4, 1) | 111011 |
| (1, 3) | 1111001 | (4, 2) | 1111111000 |
| (1, 4) | 111110110 | | |
| (1, 5) | 11111110110 | | (OMITTED) |
| (1, 6) | 1111111110000100 | | |
| (1, 7) | 1111111110000101 | (14, 10) | 1111111111110100 |
| (1, 8) | 1111111110000110 | (15, 0) | 11111111001 |
| (1, 9) | 1111111110000111 | (15, 1) | 1111111111110101 |
| (1, 10) | 1111111110001000 | (15, 2) | 1111111111110110 |
| (2, 1) | 11100 | (15, 3) | 1111111111110111 |
| (2, 2) | 11111001 | (15, 4) | 1111111111111000 |
| (2, 3) | 1111110111 | (15, 5) | 1111111111111001 |
| (2, 4) | 111111110100 | (15, 6) | 1111111111111010 |
| (2, 5) | 1111111110001001 | (15, 7) | 1111111111111011 |
| (2, 6) | 1111111110001010 | (15, 8) | 1111111111111100 |
| (2, 7) | 1111111110001011 | (15, 9) | 1111111111111101 |
| (2, 8) | 1111111110001100 | (15, 10) | 1111111111111110 |

FIG. 11

DC (DIFFERENCE FROM DC COEFFICIENTS OF PRECEDING BLOCK IS 2)

| (GROUP NO.) | HUFFMAN CODE | ADDITIONAL BITS |
|---|---|---|
| (2) | 011 | 10 |

AC

| (RUN-LENGTH, GROUP NO.) | HUFFMAN CODE | ADDITIONAL BITS |
|---|---|---|
| (0, 2) | 01 | 10 |
| (0, 2) | 01 | 10 |
| (0, 1) | 10 | 0 |
| (0, 1) | 10 | 1 |
| (4, 1) | 111011 | 1 |
| (15, 0) | 11111111001 | NONE |
| (15, 0) | 11111111001 | NONE |
| (15, 0) | 11111111001 | NONE |
| (0, 0) | 1010 | NONE |

(63 BITS IN TOTAL)

IMAGE SIGNAL CODING APPARATUS WITH SWITCHING BETWEEN VARIABLE-LENGTH CODING AND FIXED-LENGTH CODING

BACKGROUND OF THE INVENTION

The present invention relates to an image signal coding apparatus.

In such systems as digital copiers and printers that process high-resolution images, a vast amount of image data need to be transferred at high speed within the system. Further, with improvements in the resolution and in the quality of images by employing multi-value and color images instead of binary images, the data amount of each image is now greatly increasing. Therefore, high-speed digital copiers and printers have a problem that the transmission line bandwidth within the system becomes insufficient.

Under the above circumstances, it is now being studied to eliminate bottlenecks in terms of the data transmission and storage by introducing an image coding technique into the inside of a system and reducing the data amount by compression in the data transmission and storage.

The following conditions should be considered in selecting a coding scheme for the above purpose:

Condition 1: high image quality can be attained at a large compression ratio.

Condition 2: A worst value of the compression ratio can be assured for each coding unit, and synchronization can be obtained with the pixel clock (fixed period) of input/output devices.

In particular, condition 2 needs to be satisfied because of the following backgrounds:

Background 1: Where coded data is directly written to a disk to temporarily store an input image with the amount of coded data being varied, a buffer memory is needed. This causes a cost increase.

Background 2: In the xerography, since an electrostatic latent image is formed on a photoreceptor rotating at a constant speed with a laser beam modulated by an image signal, the image signal needs to be always provided in synchronism with a fixed clock; that is, the image clock cannot be varied or stopped in accordance with a variation of the image decoding speed. Therefore, where the decoding pixel rate has a variation, a buffer memory is needed as in the case of background 1. This causes a cost increase.

Various techniques have been invented to efficiently code gradation images and color images. The coding schemes are classified into the reversible coding which can reproduce the same image as an original image and the non-reversible coding in which a decoded image is not identical to an original image due to an information loss. In general, the non-reversible coding can provide a large compression ratio. Typical examples of the non-reversible coding are the quadrature transform coding and the block truncation coding, which will be briefly explained below.

In the quadrature transform coding, an image is divided into pixel blocks (rectangular regions of pixels), and converted to frequency domain signals by quadrature transform on a block-by-block basis. In natural images such as portraits and landscapes, which have strong autocorrelation of pixel values, most of signal power after the quadrature transform concentrates in low-frequency coefficients. A compression effect can be attained as a whole by utilizing this tendency, more specifically, by quantizing, after the quadrature transform, low-frequency coefficients with high accuracy to allocate many bits thereto and quantizing high-frequency coefficients roughly to reduce the number of bits.

In the block truncation coding, an image is divided into pixel blocks (rectangular regions of pixels), and pixels values of a block are approximated by a plurality of representative gradation value; and resolution information indicating by which representative value each pixel is expressed.

The above two coding schemes are compared with each other in terms of the image quality and the compression ratio. By virtue of high reproduction performance, the quadrature transform coding can code photographic regions at a large compression ratio. However, if it is applied to an image including many edges such as a text, there occurs a problem of image quality deterioration due to reduction of the coding efficiency and discard of high-frequency coefficients, because power spreads to high-frequency coefficients.

While the block truncation coding can satisfactorily reproduce an image having steep edges such as a text, it cannot properly reproduce a region having a subtle variation of gradations, such as a photographic region.

Next, the two coding schemes are compared with each other in terms of the code amount variation performance. In the quadrature transform coding, the code amount tends to vary constantly from one pixel block to another due to variation of a signal power distribution after the transform depending on the content of a pixel block and mismatching of a code table in variable-length coding.

On the other hand, the block truncation coding has a general feature that code amounts of the pixel blocks can be equalized (fixed-length coding) by making the resolution information and the gradation information of each pixel block have constant sizes.

Since the quadrature transform coding and the block truncation coding have complementary features as described above, there have been proposed techniques of using those two coding schemes together.

For example, Japanese Unexamined Patent Publication No. Sho. 63-306768 discloses a technique of using the above two coding schemes together to improve the image quality. Referring to FIG. 18, a description will be made of a configuration of the conventional technique of this publication. In FIG. 18, a one-block extracting section 1 extracts a pixel block that is a rectangular region of a plurality of pixels from an input image signal. An AC component judgment section 2 compares AC power of the pixel block with a predetermined threshold, and supplies the pixel block to a transform coding section 3 when the AC power is small and to a block truncation coding section 4 when the AC power is large. The transform coding section 3 transform-coding the pixel block and outputs coded data. The block truncation coding section 4 codes, by block truncation coding, the pixel block and outputs coded data.

The operation of the above technique will be described with reference to FIG. 18. The AC component judgment section 2 calculates AC power, i.e., a sum of squares of AC components, of a pixel block extracted from an input image signal, and compares it with a predetermined threshold $TH_{AC}$. If the block AC power is smaller than $TH_{AC}$, i.e., the pixel block includes only a small amount of AC components such as noise and high-frequency waves, the pixel block is coded by the transform coding section 3. If the block AC power is larger than or equal to $TH_{AC}$, the pixel block is judged as including a large amount of AC components such as noise and high-frequency components and coded by the block truncation coding section 4.

With the above configuration and operation, blurring of outlines in a reproduced image can be prevented which blurring would otherwise occur when a pixel block including a large amount of AC components is subjected to transform coding.

The above conventional technique uses together the quadrature transform coding and the block truncation coding to reproduce high quality images irrespective of existence of edges. Although this technique satisfies condition 1 mentioned above, it does not assure a worst value of the code amount, i.e., does not satisfy condition 2. Therefore, this technique cannot be used for suppressing the bandwidth within a system.

SUMMARY OF THE INVENTION

In view of the above problem, an object of the present invention is to suppress the transmission bandwidth within a system such as a digital copier or a printer.

Another object of the invention is to provide a coding apparatus assuring good image quality and the coding rate/pixel rate being smaller than a predetermined value without depending on variation (existence of edges) of image characteristics from one pixel block to another.

FIG. 1(a) shows a general configuration of an image signal coding apparatus according to the present invention. To attain the above objects, the image signal coding apparatus comprises block extracting means 100 for extracting a pixel block of m×n pixels from an image, where m and n are positive integers; first coding means 200 for coding the extracted pixel block into variable-length coded data; second coding means 300 for coding the extracted pixel block into fixed-length coded data; code amount counting means 400 for counting code word lengths of the variable-length coded data, to determine a code amount of the pixel block; code amount judging means 500 for comparing the code amount with a first threshold, and outputting a comparison result as discrimination information; selecting means 600 for selecting the variable-length coded data or the fixed-length coded data based on the discrimination information; and storing means 700 for storing the selected coded data and the discrimination information in a correlated manner.

FIG. 1(b) shows a general configuration of another image signal coding apparatus according to the invention. To attain the above objects, the image signal coding apparatus comprises block extracting means 100 for extracting a pixel block of m×n pixels from an image signal, where m and n are positive integers; first coding means 200 for coding the extracted pixel block into variable-length coded data; second coding means 300 for coding the extracted pixel block into fixed-length coded data; code amount counting means 400 for counting code word lengths of the variable-length coded data, to determine an intermediate code amount and a code amount of the pixel block; code amount judging means 500 for comparing the code amount of the pixel block with a second threshold, and outputting a comparison result as discrimination information; selecting means 600 for selecting the variable-length coded data or the fixed-length coded data based on the discrimination information; storing means 700 for storing the selected coded data and the discrimination information in a correlated manner; and termination judging means 800 for comparing the intermediate code amount with a third threshold, and for judging based on a comparison result whether a coding operation of the first coding means should be terminated.

Each of the above image signal coding apparatus may further comprise dividing means provided upstream of the second coding means 300, for dividing the pixel block of m×n pixels into sub-blocks each including p×q pixels, where p and q are positive integers smaller than m and n, respectively.

BRIEF DESCRIPTION OF THE DRAWINGS

FIGS. 3(a)–3(f) show an example of DCT and quantization;

FIG. 6 shows how a DC coefficient is subjected to grouping;

FIG. 7 shows an example of a Huffman code table for a DC coefficient;

FIG. 8 shows how an AC coefficient is subjected to grouping;

FIG. 9 shows two-dimensional Huffman coding for AC coefficients;

FIG. 10 shows an example of a Huffman code table for AC coefficients;

FIG. 11 shows an example of coding the quantized coefficients of FIG. 3(c);

FIG. 12 shows an output bit sequence;

DESCRIPTION OF THE PREFERRED EMBODIMENTS

Embodiment 1

Referring to a block diagram of FIG. 2, a coding apparatus according to a first embodiment of the present invention will be described below.

Figure 1A:
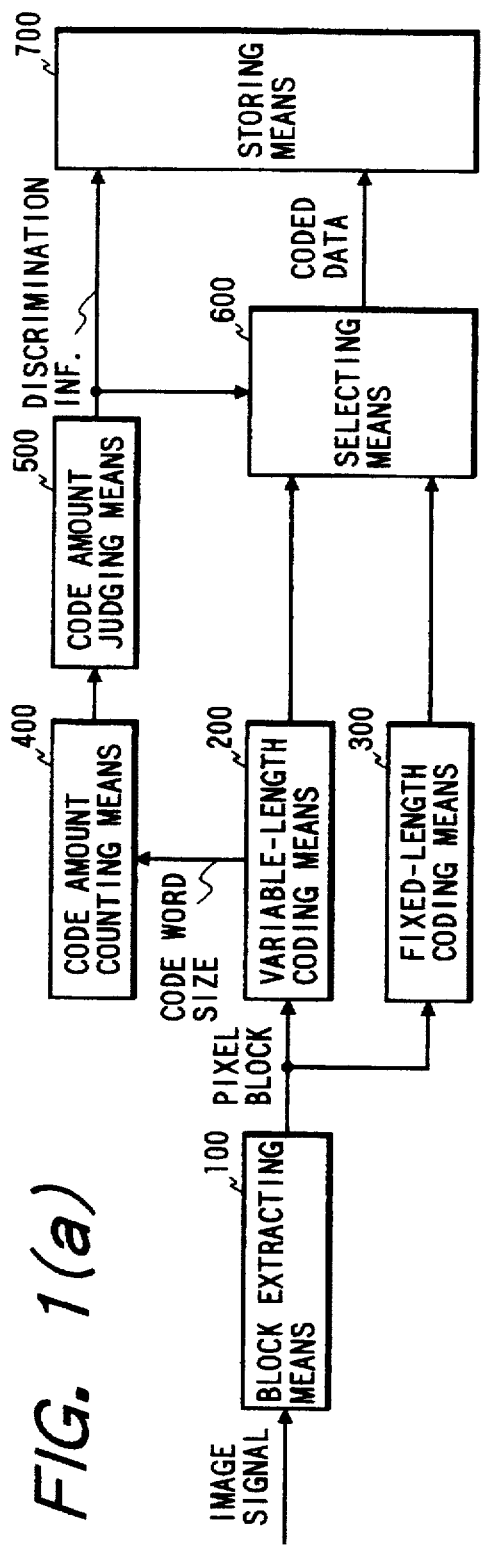
FIGS. 1(a) and 1(b) are block diagrams showing general configurations of coding apparatuses of the present invention.
Figure 1B:
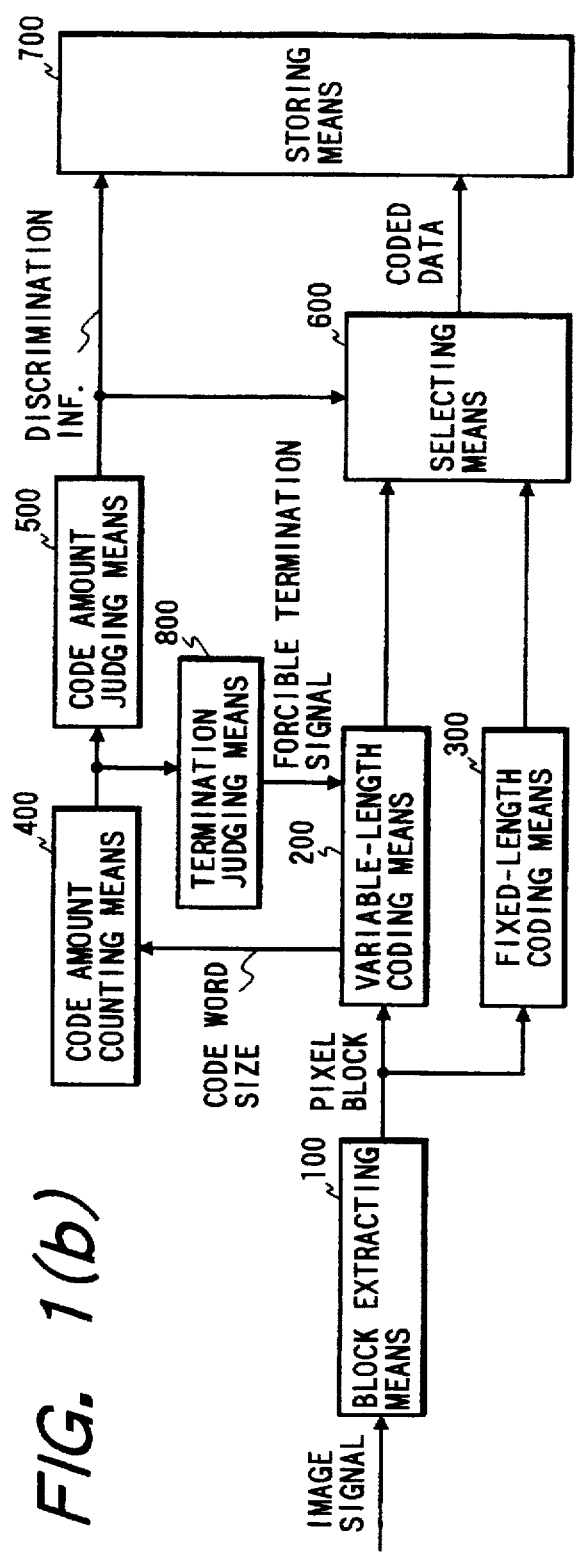
Figure 2:
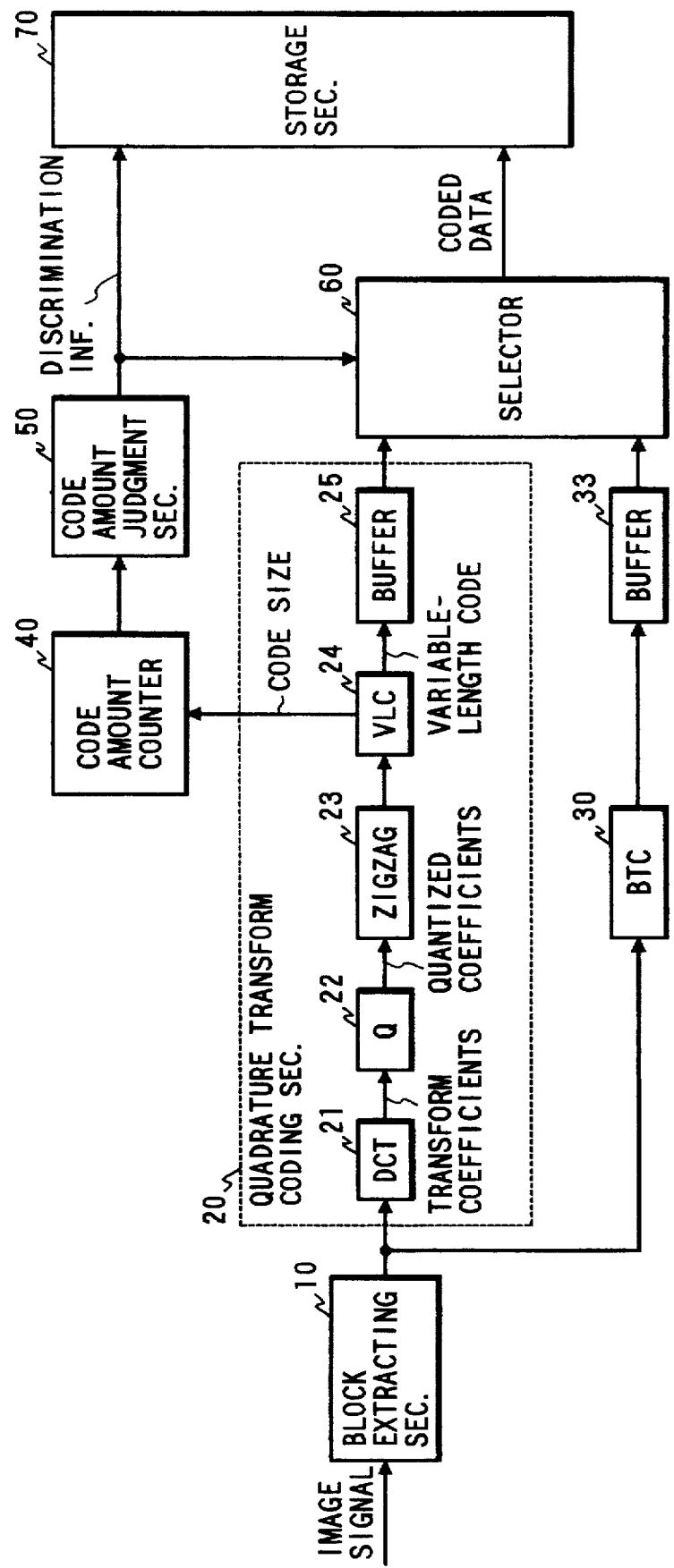
FIG. 2 is a block diagram showing a configuration of a coding apparatus according to a first embodiment of the invention.

In FIG. 2, a block extracting section 10 extracts a pixel block of m×n pixels (m, n: positive integers) from an image signal. A quadrature transform coding section 20 has the following components. A DCT section 21 performs discrete cosine transform (hereinafter referred to as DCT) on the extracted pixel block and outputs resultant transform coefficients. A quantizing section 22 quantizes the transform coefficients according to prescribed quantizing characteristics and outputs resultant quantized coefficients. A scan converting section 23 rearranges the quantized coefficients by scanning its matrix in a zigzagged manner. A variable-length coding section 24 allocates variable-length codes (VLCS) to a combination of quantized coefficients that have been rearranged into a zigzag scanning order. A buffer 25 stores the variable-length codes in their output order.

A block truncation coding section 30 performs block truncation coding on the pixel block and outputs representative gradation values and resolution information. A fixed-length code buffer 33 stores, as coded data, the representative gradation values and resolution information.

A code amount counter 40 counts, on a block by block basis, the number of bits of variable-length codes allocated by the variable-length coding section 24. A code amount judgment section 50 compares a count result with a preset threshold and outputs a result of the magnitude comparison as discrimination information. A selector 60 selects the coded data stored in the variable-length code buffer 25 or the fixed-length code buffer 33, and outputs the selected coded data. A storage section 70 stores the discrimination information and the coded data in a correlated manner.

Referring to FIG. 2, the operation of the coding apparatus according to the first embodiment will be described.

First, the block extracting section 10 extracts a pixel block of m×n pixels (m, n: positive integers) from an image signal. FIG. 3(a) shows an 8×8 pixel block, and the following description is directed to a case where pixel blocks of this size are used.

The quadrature transform coding section 20 performs DCT coding, which is one of transform coding schemes, on each extracted pixel block. There is known a DCT type quadrature transform coding scheme that is disclosed in G. K. Wallace: "The JPEG Still Picture Compression Standard," Communications of the ACM, April 1991.

Now, a detailed description will be made of a coding operation of the quadrature transform coding section 20 shown in FIG. 2.

The DCT section 21 performs DCT on an input rectangular pixel block of 8×8 pixels. Eighth-order, two-dimensional DCT is given by Equation (1) and its inverse transform is given by Equation (2).

$$F(u,v) = \frac{C(u)C(v)}{4} \sum_{i=0}^{7} \sum_{j=0}^{7} f(i,j) \cos\frac{(2i+1)u\pi}{16} \cos\frac{(2j+1)v\pi}{16} \quad (1)$$

$$f(i,j) = \frac{1}{4} \sum_{u=0}^{7} \sum_{v=0}^{7} C(u)C(v)F(u,v) \cos\frac{(2i+1)u\pi}{16} \cos\frac{(2j+1)v\pi}{16} \quad (2)$$

where $$C(w) = \begin{cases} \frac{1}{\sqrt{2}} & w=0 \\ 1 & w=1,2,\ldots,7 \end{cases}$$

In the above equations, f(i, j) is each element of a pixel block, and i and j represent a position of that element. F(u, v) is an element of transform coefficients, and u, and v represent a position of that element. C(w) means C(u) or C(v).

FIG. 3(b) shows transform coefficients that are obtained by performing the 8th-order, two-dimensional DCT of Equation (1) on the pixel block of FIG. 3(a). An element that is located at the top-left corner of a transform coefficient matrix (see FIG. 4), which element corresponds to an average 15 luminance of the pixel block, is called a DC coefficient. Elements other than the DC coefficient are called AC coefficients.

Figures 4, 5:
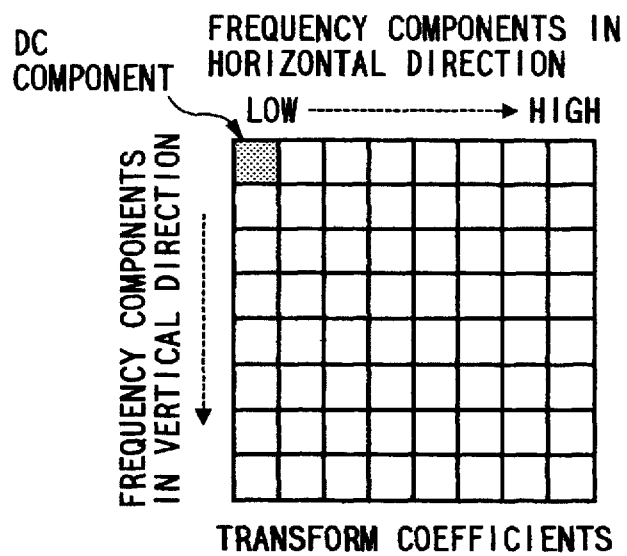
FIG. 4 illustrates transform coefficients.
FIG. 5 shows how quantized coefficients are converted to a one-dimensional sequence by a zigzag scan.

Further, as shown in FIG. 4, AC coefficients located closer to the rightmost column correspond to higher frequency components in the horizontal direction and AC coefficients located closer to the bottom row correspond to higher frequency components in the vertical direction. Therefore, the bottom-right element of a matrix corresponds to the highest frequency component in both horizontal and vertical directions.

Transform coefficients that are output from the DCT section 21 are quantized by the quantizing section 22 and output as quantized coefficients. The quantization is a process for calculating quotients by dividing elements of transform coefficients by corresponding elements of a quantization matrix, and is defined by the following equations:

$$F^Q(u,v)=\{F(u,v)+Q(u,v)/2\}/Q(u,v)(F(u,v)\geq 0) \quad (4)$$

$$F^Q(u,v)=\{F(u,v)-Q(u,v)/2\}/Q(u,v)(F(u,v)<0) \quad (5)$$

where F(u, v), Q(u, v) and $F^Q$(u, v) are an element of transform coefficients, an element of a quantization matrix, and an element of quantized coefficients, respectively. Parameters u and v represent an element position.

FIG. 3(c) shows an example of a quantization matrix that are determined in consideration of visual characteristics of respective frequency components. In general, as shown in FIG. 3(c), small values are set for coefficients corresponding to low-frequency components to attain highly accurate quantization and large values are set for coefficients corresponding to high-frequency components to perform rough quantization.

FIG. 3(d) shows quantized coefficients obtained by linearly quantizing the transform coefficients of FIG. 3(b) by using the quantization coefficients of FIG. 3(c).

In the scan converting section 23, the quantized coefficients are zigzag-scanned in the order of numbers 0–63 of a matrix shown in FIG. 5 so as to be converted to a one-dimensional sequence.

In the variable-length coding section 24, the one-dimensional quantized coefficients are. The coding is performed separately for a DC component and AC components with Huffman code tables prepared for those two kinds of components.

First, a description will be made of coding of a DC coefficient. To encode a DC component, a difference of the subject DC coefficient from a DC coefficient of the immediately preceding block is calculated and a group number is determined according to a table shown in FIG. 6. The group number thus determined is subjected to Huffman coding. To indicate which value of the group the difference corresponds to, additional bits having the same number of bits as the group number are provided.

In the case of the quantized coefficients of FIG. 3(d), if it is assumed that a DC coefficient of the immediately preceding block is 14, the difference of the DC coefficient of the subject block from that of the immediately preceding block is calculated such that 16−14=+2. According to the table of FIG. 6, the group number is determined as 2. According to a code table for DC coefficients shown in FIG. 7, a code corresponding to the group number 2 is found to be a binary code "011." Further, to discriminate among four values of −3, −2, 2 and 3 that belong to the group number 2, 2-bit information is provided. In this case, "10" is provided for the value 2.

Next, a description will be made of coding of AC coefficients.

AC components are coded in the order of the numbers 1–63 of the matrix shown in FIG. 5. Counting is made in this order until detection of a non-zero coefficient (effective coefficient) to determine the length (zero-run) of consecutive zero coefficients (ineffective coefficients). Upon detection of an effective coefficient, a group number corresponding to the coefficient value is determined according to a table shown in FIG. 8. Additional bits indicating which value of the group the AC coefficient corresponds to are also determined.

In a code table for AC coefficients, a Huffman code is allocated to a combination a zero-run of ineffective coefficients and a group number of a subsequent effective coefficient. FIG. 9 shows 256 combinations of a zero-run and a group number, specifically, from (0, 0) to (15, 15). Each combination is given a binary code as shown in FIG. 10.

As described above, AC coefficients are coded based on a combination of a zero-run of ineffective coefficient and a group number of a subsequent effective coefficient, and additional bits indicating which value of the group the effective coefficient corresponds to. The above operation continues until all of the effective coefficients of the block are processed. If it is found that all of the remaining AC coefficients of the block are zero, EOB is coded (a block termination code) at that time to complete the one-block process.

FIG. 11 shows an example in which the quantized coefficients of FIG. 3(d) are coded by the above procedure. FIG. 12 shows a bit sequence that is output as codes. In this example, information of 512 bits in total in which a pixel consists of 8 bits and a block consists of 8×8 pixels is compressed to 63 bits.

In a decoding process, Huffman decoding is performed in a procedure reverse to the above, to reproduce the quantized coefficients of FIG. 3(d). Inversely quantized coefficients shown in FIG. 3(e) are then obtained by multiplying the quantized coefficients by corresponding elements of the quantization matrix of FIG. 3(c). Further, a decoded pixel block shown in FIG. 3(f) is obtained by performing inverse DCT of Equation (2) on the inversely quantized coefficients.

With the above processes, image information can be coded and decoded according to the transform coding scheme. In the case of the transform coding scheme, the size of coded data varies depending on the contents of a pixel block.

Coded data that are output from the variable-length coding section 24 stored into the variable-length code buffer 25.

Next, a detailed description will be made of a coding operation of the block truncation coding section 30. The following description will be directed to a case of binary block truncation coding.

First, an average $\mu$ of pixel values of a block including m×n (m, n: positive integers) that have been extracted from an image signal by the block extracting section 10 is calculated according to Equation (6).

$$\mu = \frac{1}{mn} \sum_{i=0}^{m} \sum_{j=0}^{n} x_{ij} \quad (6)$$

$$A = \frac{1}{N_A} \sum_{x_{ij} \geq \mu} x \quad (7)$$

$$B = \frac{1}{N_B} \sum_{x_{ij} < \mu} x \quad (8)$$

Then, pixel values of the block are compared with the average $\mu$, and pixel values larger than or equal to the average $\mu$ are classified as group 1 and pixel values smaller than it are classified as group 0. Letting $N_A$ and $N_B$ denote the number of pixels classified as group 1 and the number of pixels classified as group 0, respectively, averages A and B of the pixels belonging to groups 1 and 0 are calculated according to Equations (7) and (8), respectively. A and B are called representative gradation values of the respective groups.

One-bit information (0 or 1) indicating which group a pixel of the block belongs to is called resolution information.

The block truncation coding is completed in the above manner, as a result of which the representative gradation values and the resolution information are stored, as coded data, into the fixed-length code buffer 33.

Figure 13A:
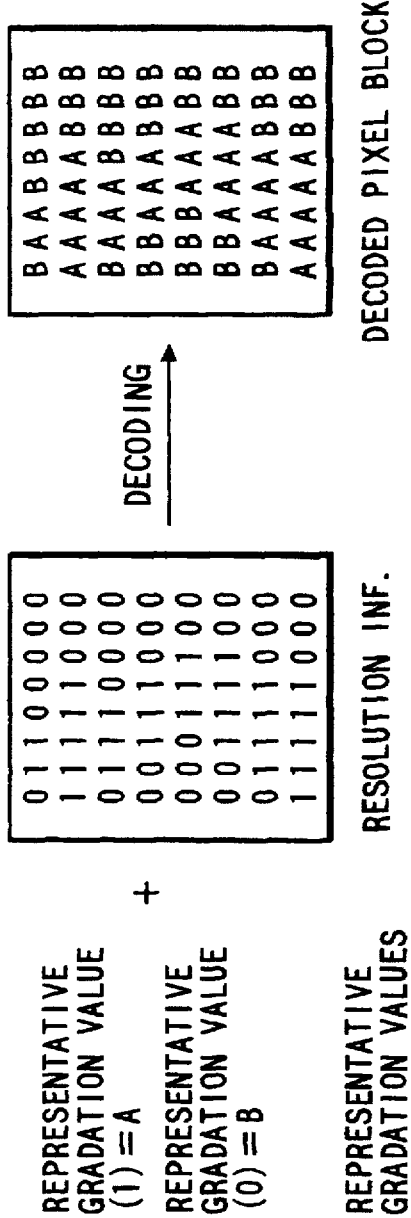
FIGS. 13(a) and 13(b) illustrate an example of block truncation coding in the first embodiment.

FIG. 13(a) shows an example of coded data and decoded pixel block of the block truncation coding. In the following, it is assumed that the pixel block size is 8 pixels by 8 pixels and each pixel has 8-bit resolution (256 levels). An image is reproduced by replacing positions of pixels having resolution information 0 with the representative gradation value A of group 1 and positions of pixels having resolution information 1 with the representative gradation value B of group 0.

Figure 13B:
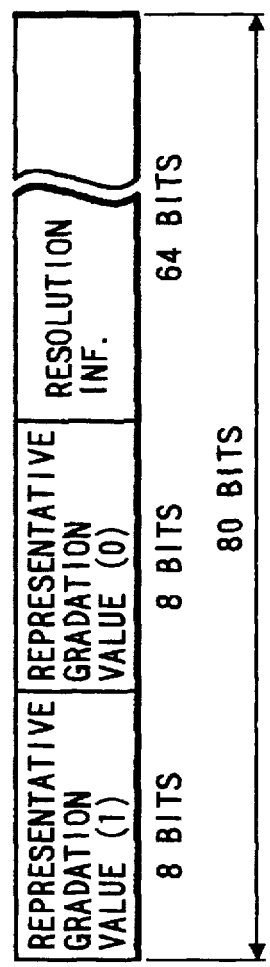

FIG. 13(b) shows an example of a configuration of coded data generated by the block truncation coding. The two representative gradation values are assigned 16 bits and the resolution information is assigned 64 bits; that is, one pixel block is coded by use of 80 bits. The compression ratio is calculated as follows:

(compression ratio) = (data amount of original pixel block)/(coded data amount)
= (8 [pixels] × 8 [pixels] × 8 [bits])/80 [bits]
= 6.4

Four-value block truncation coding can be realized in a similar manner. In this case, four representative gradation values are assigned 32 bits and resolution information is assigned 2 bits per pixel, i.e., 2[bits]×64[pixels]=128[bits] for the entire block; that is one pixel block is coded by use of 160 bits in total.

The compression ratio is calculated as follows:

(compression ratio) = (data amount of original pixel block)/(coded data amount)
= (8 [pixels] × 8 [pixels] × 8 [bits])/160 [bits]
= 3.2

In the case of the block truncation coding, the compression ratio is predetermined by the combination of representative gradation values and resolution information, so that the compression ratio can be made constant without depending on the contents of pixel blocks.

Referring to FIG. 2, the code amount counter 40 performs, on a block by block basis, a counting operation to determine the size of variable-length codes that have been assigned by the variable-length coding section 24. The count value is reset to zero upon completion of a one-block operation.

The code amount judgment section 50 compares the size of variable-length codes of one pixel block which size has been determined by the code amount counter 40 by the counting operation with the predetermined threshold. A comparison result, i.e., discrimination information, is not only supplied to the selector 60 but also stored into the storage section 70.

The threshold may be the size of codes that are output from the block truncation coding section 30. In the case of the above-described binary block truncation coding, 80 bits is set as the threshold. If the size of one-block variable-length codes is smaller than 80 bits, a value 0 is output as 1-bit discrimination information. If the size of one-block variable-length codes is larger than 80 bits, a value 1 is output as 1-bit discrimination information.

When receiving discrimination information of 0, the selector 60 reads the coded data stored in the variable-length code buffer 25 and stores it into the storage section 70. When receiving discrimination information of 1, the selector 60 reads the coded data stored in the fixed-length code buffer 33 and stores it into the storage section 70.

After execution of the above procedure, the discrimination information for the respective blocks and the corresponding coded data are stored in the storage section 70, and the coding operation is finished.

With the above configuration and operation, for any kind of input pixel block, codes of one block are so generated as to have a size that is not larger than the one-block code size of the fixed-length coding. Therefore, the code size variation can be suppressed.

As stated in the above description of the prior art, the quadrature transform coding can code an image dominated by gradation such as a photographic region efficiently, i.e., with a small code amount. However, if it is applied to an image including edges such as a text, the efficiency is low (code amount is large). In the first embodiment, by virtue of the adaptation based on the code amount, selection is automatically made such that the quadrature transform coding is applied to a photographic region and the block truncation coding is applied to a text region without performing direct discrimination between a photographic region and a text region. Therefore, the first embodiment can improve the image quality to an extent similar to the case of the conventional technique.

Embodiment 2

Figure 14:
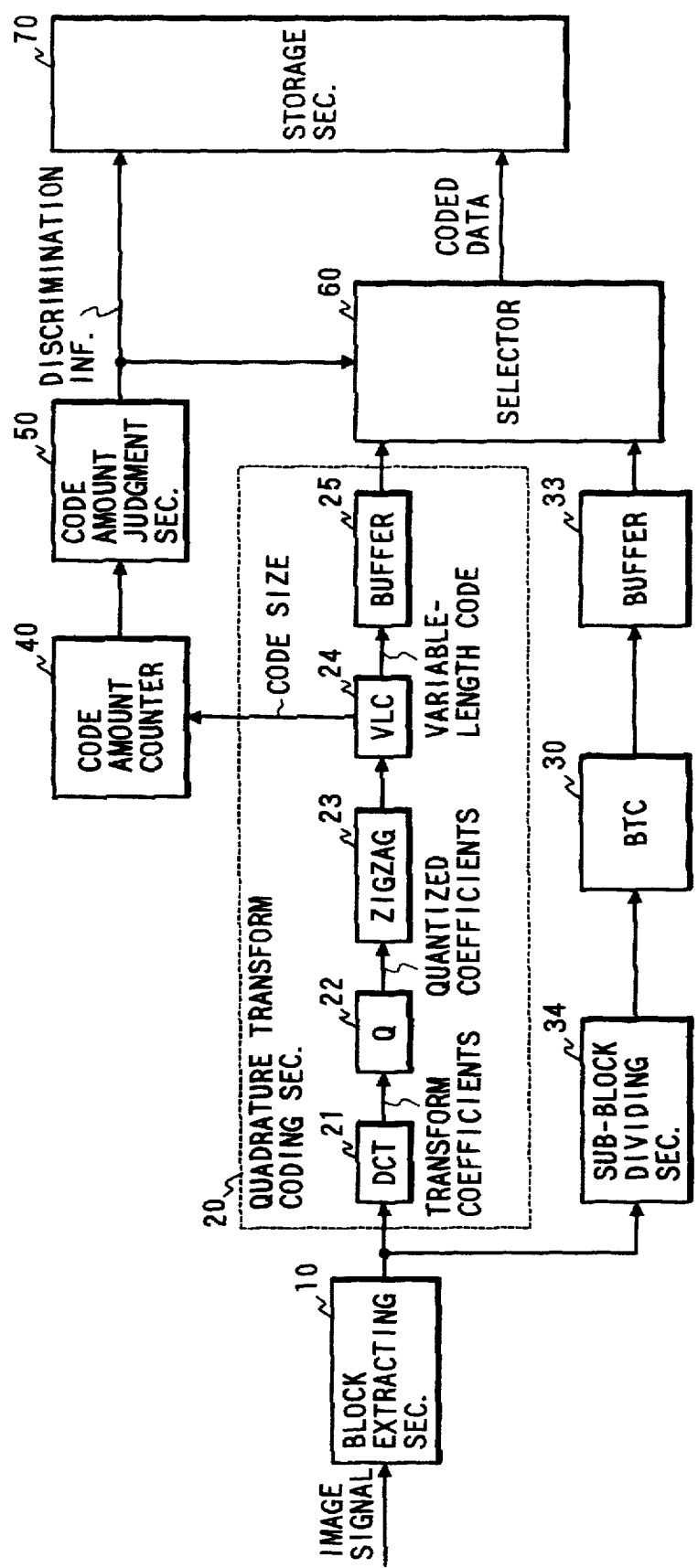
FIG. 14 is a block diagram showing a configuration of a coding apparatus according to a second embodiment of the invention.

Referring to a block diagram of FIG. 14, a configuration of a coding apparatus according to a second embodiment of the invention will be described. The components in FIG. 14 that are the same as or similar to those in FIG. 2 are given the same reference numerals and descriptions therefor will be omitted. In FIG. 14, a sub-block dividing section 34 divides a pixel block of m×n pixels (m, n: positive integers) that has been extracted from an image signal by the block extracting section 10 into sub-blocks of p×q pixels (p, q: positive integers smaller than m and n, respectively).

The operation of the coding apparatus of the second embodiment will be described with reference to FIGS. 15(a) and 15(b).

Figure 15A:
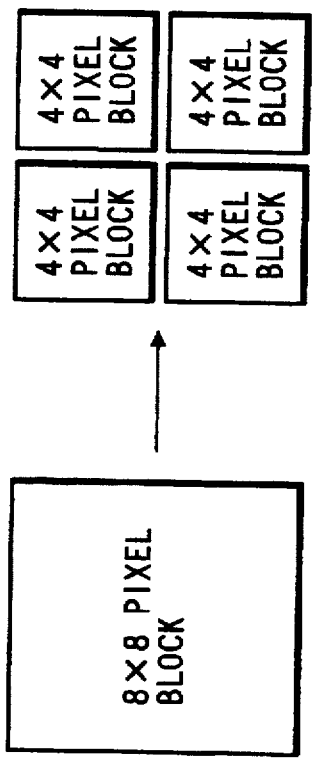
FIGS. 15(a) and 15(b) illustrate an example of block truncation coding in the second embodiment.

FIG. 15(a) shows an example in which a block of 8×8 pixels is divided into sub-blocks of 4×4 pixels. The block truncation coding section 30 performs, for instance, binary block truncation coding on each sub-block.

Figure 15B:
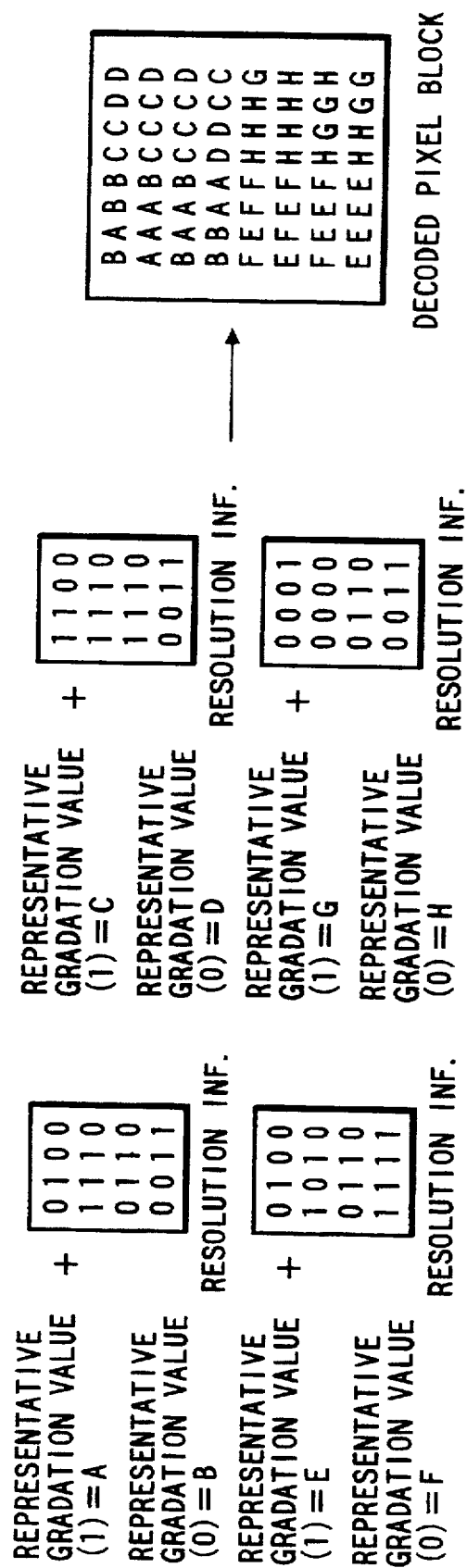

FIG. 15(b) shows an example of coded data produced by binary block truncation coding that is performed on a sub-block basis. For each sub-block, coded data consists of two representative gradation values (2×8 bits) and resolution information (4×4=16 bits) for 16 pixels. Therefore, the code amount per pixel block is 4×(16+16)=128 bits.

In this case, the compression ratio is calculated as follows:

(compression ratio) = (data amount of original pixel block)/(coded data amount)
= (8 [pixels] × 8 [pixels] × 8 [bits])/128 [bits]
= 4

The remaining operation is not described here because it is the same as in the first embodiment except that a threshold of 128 bits is set in the code amount judgment section 50. In the second embodiment, one block can be expressed by eight representative gradation values at the maximum with the number of bits smaller than in 4-value block truncation coding that is performed for each block of 8×8 pixels, while a compression ratio of 4 is assured even in the worst case.

The size of sub-blocks is not limited to 4×4 pixels, and the block truncation coding performed for each sub-block is not limited to binary one.

Embodiment 3

Referring to a block diagram of FIG. 16, a configuration of a coding apparatus according to a third embodiment of the invention will be described. The components in FIG. 16 that are the same as or similar to those in FIGS. 2 and 14 are given the same reference numerals and descriptions therefor will be omitted.

Figure 16:
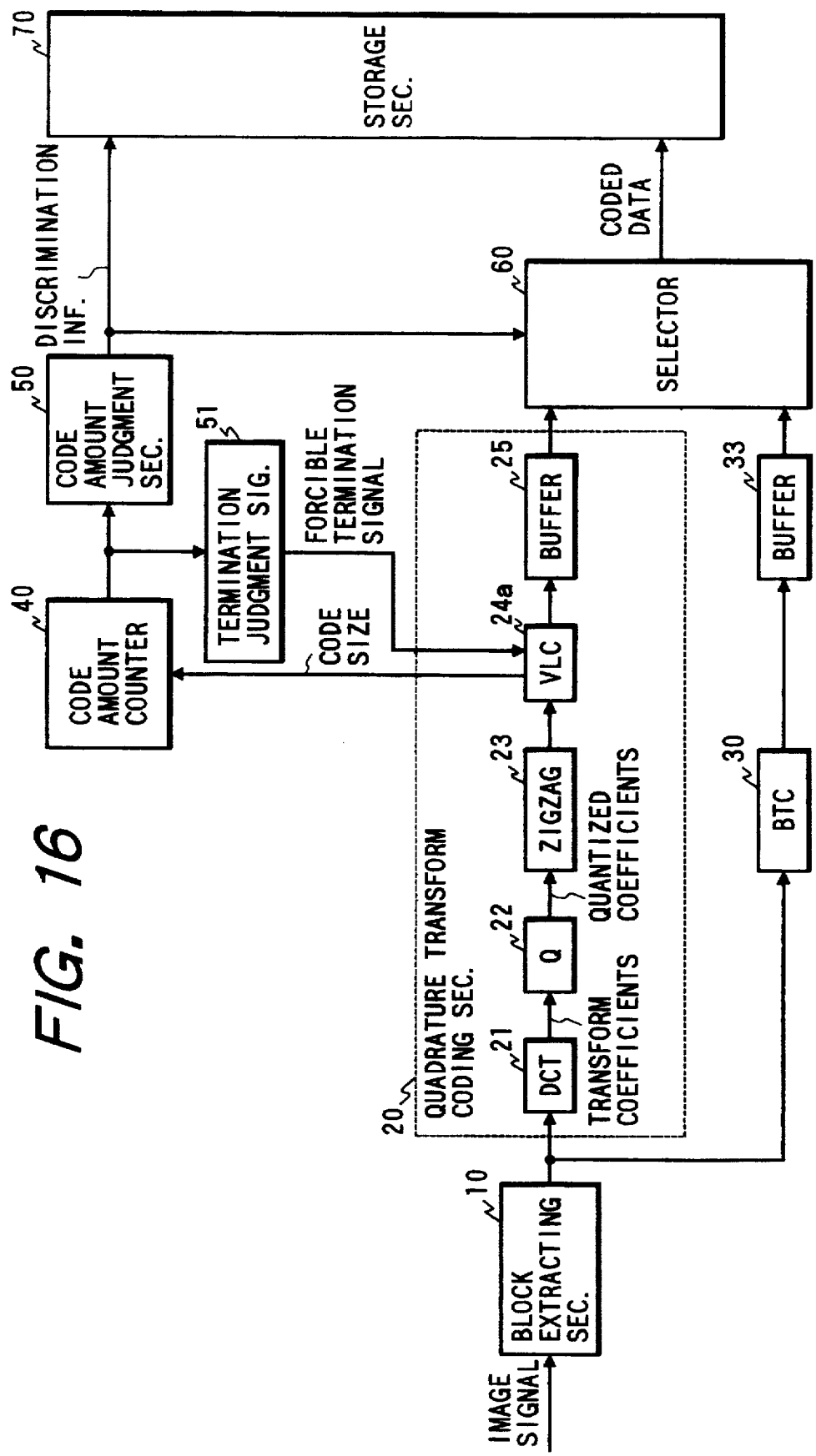
FIG. 16 is a block diagram showing a configuration of a coding apparatus according to a third embodiment of the invention.
Figure 17:
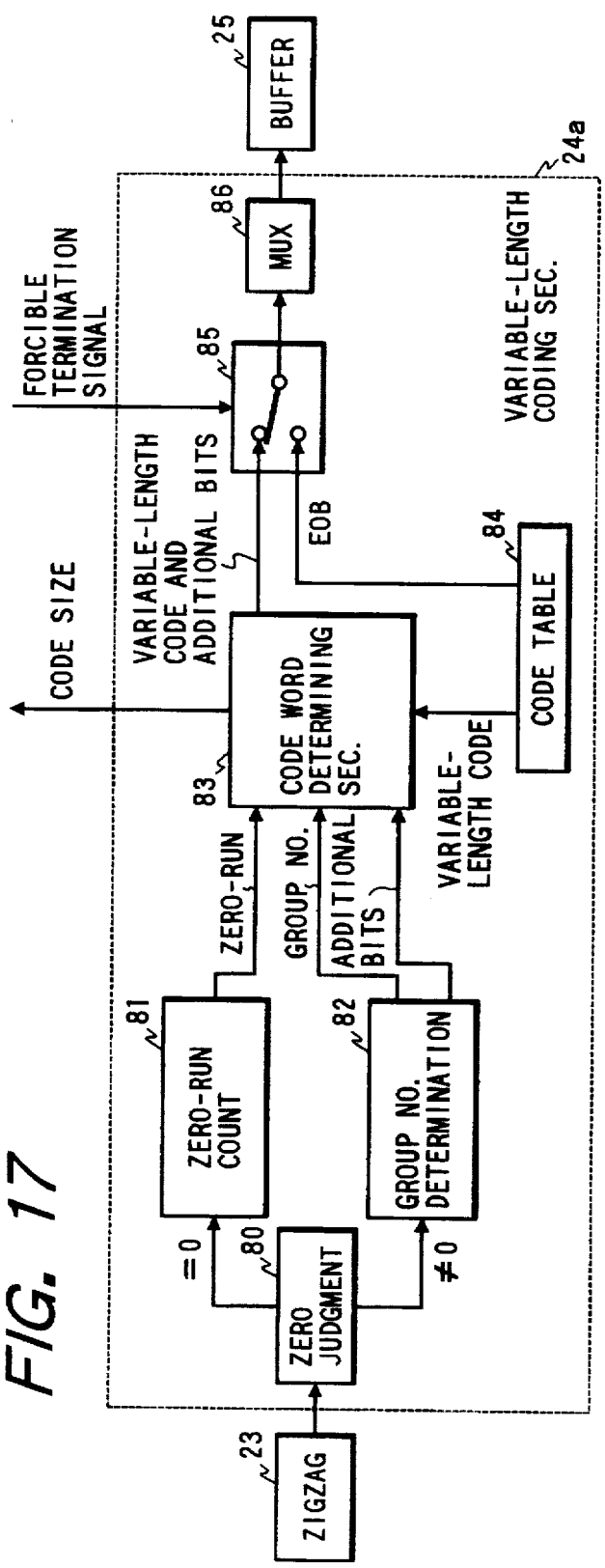
FIG. 17 is a block diagram showing a configuration of a variable-length coding section in the third embodiment.
Figure 18:
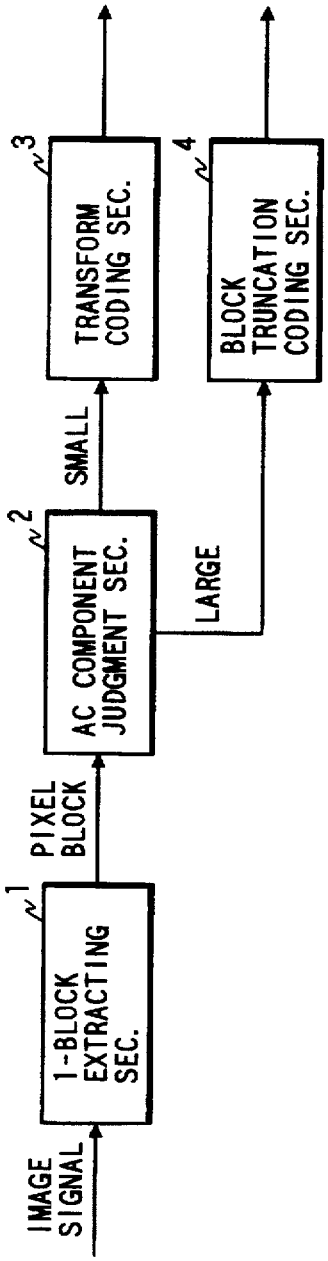
FIG. 18 is a block diagram showing a configuration of a conventional technique.

FIG. 17 shows a configuration of a variable-length coding section 24a shown in FIG. 16. In FIG. 17, a zero judgment section 80 judges whether an input quantized coefficient is zero or not. A zero-run counter 81 performs a counting operation to determine the length of consecutive zero coefficients. A group number determining section 82 determines a group number of a non-zero coefficient. A code word determining section 83 determines a bit sequence consisting of a variable-length code corresponding to an input zero-run and group number and additional bits. Variable-length codes are registered in a code table 84. A switching section 85 switches between the output of the code word determining section 83 and EOB (end of block, i.e., a block termination code) in accordance with an instruction. A multiplexing section 86 multiplexes outputs of the switching section 85.

The operation of the coding apparatus of the third embodiment will be described with reference to FIGS. 16 and 17. Descriptions for the same operations as in the first and second embodiments will be omitted.

In FIG. 17, quantized coefficients are rearranged into a zigzag-scan order by the scan converting section 23, and then subjected to zero/non-zero judgment in the zero judgment section 80. The length of consecutive zero quantized coefficients is determined by the zero-run counter 81 by its counting operation. A group number of a non-zero coefficient is determined by the group number determining section 82, and output together with additional bits.

In the code word determining section 83, a variable code word corresponding to the input zero-run length and group number is read from the code table 84, and a bit sequence is generated which consists of the variable-length code and the additional bits. The length of the bit sequence is output as a code size. The bit sequence is supplied via the switching section 85 and the multiplexing section 86 to the variable-length code buffer 25 and stored therein.

Referring to FIG. 16, code sizes are counted, i.e., accumulated by a code amount counter 40. The code amount counter 40 is reset for each pixel block. Successively monitoring the accumulation value of the code amount counter 40, a termination judgment section 51 supplies a forcible termination signal to the variable-length coding section 24a when the accumulation value exceeds a predetermined threshold. For example, the predetermined threshold is the size of codes generated by the block truncation coding section 30 minus the length of EOB.

That is, when the accumulation value of code amounts exceeds the threshold by addition of a new bit sequence generated by the code word determining section 83, the forcible termination signal causes the switching section 85 to be so switched as to select EOB instead of the bit sequence, and the one-block coding operation is finished.

While the switching section 85 stops outputting codes after outputting EOB, the code word determining section 83 continues to determine code words for the remaining quantized coefficients. The code amount counter 40 continues to accumulate code sizes that are output from the code word determining section 83, to finally determine the total amount of codes that are assigned to all of the quantized coefficients of one pixel block.

Comparing the total amount of codes with a predetermined threshold, the code amount judgment section 50 outputs a comparison result as discrimination information.

For example, the threshold TH is set larger than an amount C (constant) of codes that are generated by the block truncation coding. Letting V denote a total amount of codes that are to be assigned originally to the entire quantized coefficients of one block in the variable-length coding section 24a, the operation of the selector 60 is set as follows:

V≦C: Select codes generated by the quadrature transform coding.

C<V≦TH: Select codes generated by the quadrature transform coding with forcible termination to prevent the total code amount from exceeding C.

TH<V: Select codes generated by the block truncation coding.

Based on the above setting, in the same manner as in the first embodiment, the code amount judgment section 50 supplies the selector 60 with discrimination information that is 0 when coded data stored in the variable-length code buffer 25 is to be selected, and is 1 when coded data stored in the fixed-length code buffer 33 is to be selected. The discrimination information is also supplied to the storage section 70 and stored therein.

The threshold TH is determined by comparing image quality of a pixel block that should originally have a code amount V(C<V≦TH) of the quadrature transform coding but is subjected to forcible termination to prevent the total code amount from exceeding C and image quality of the pixel block reproduced after being subjected to the block truncation coding.

With the above configuration and operation, the third embodiment can provide, in addition to the advantages of the first and second embodiments, an improved degree of freedom in switching between the quadrature transform coding and the block truncation coding in accordance with an original document.

As described above, according to the invention, a pixel block is coded by the two coding methods at the same time, i.e., by the first coding method for generating variable-length coded data and the second coding method for producing fixed-length coded data. If the amount of coded data produced by the first coding method is larger than the amount of coded data produced by the second coding method, the latter coded data is employed. Therefore, for any input pixel block, it is assured that the compression ratio is larger than that of the second coding method.

Conversely, if the amount of coded data produced by the first coding method is smaller than the amount of coded data produced by the second coding method, the former coded data is employed. Therefore, the coding scheme of the invention is more efficient than the case of applying the second coding method to the entire image.

Further, according to the invention, if the amount of coded data produced by the first coding method is larger than the amount of coded data produced by the second coding method, and if the amount of the coded data produced by the first coding method is smaller than the predetermined threshold, the output of the coded data produced by the first coding method is forcibly stopped so that the amount of output coded data does not exceed the amount of the coded data produced by the second coding method. Therefore, the degree of freedom in switching between the first coding method and the second coding method in accordance with an original document or a required level of image quality can be improved.

What is claimed is:

1. An image signal coding apparatus comprising:

block extracting means for extracting a pixel block of m×n pixels from an image signal, where m and n are positive integers;

first coding means for coding the extracted pixel block into variable-length coded data;

second coding means for coding the extracted pixel block into fixed-length coded data;

code amount counting means for counting code word lengths of the variable-length coded data, to determine an intermediate code amount and a code amount of the variable-length coded pixel block;

code amount judging means for comparing the code amount of the variable-length coded pixel block with a first threshold, and outputting a comparison result as discrimination information;

selecting means for selecting the variable-length coded data or the fixed-length coded data based on the discrimination information;

storing means for storing the selected coded data and the discrimination information in a correlated manner; and termination judging means for comparing the intermediate code amount with a second threshold, and for terminating a coding operation of the first coding means before the pixel block is fully variable-length coded when the intermediate code amount is greater than the second threshold.

2. The image signal coding apparatus according to claim 1, further comprising dividing means, provided upstream of the second coding means, for dividing the pixel block of m×n pixels into sub-blocks each including p×q pixels, where p and q are positive integers smaller than m and n, respectively.

3. The image signal coding apparatus according to claim 1, wherein the first threshold is larger than a code amount of the fixed-length coded data of one pixel block.

4. The image signal coding apparatus according to claim 1, wherein the second threshold is smaller than or equal to a code amount of the fixed-length coded data of one pixel block.

5. The image signal coding apparatus according to claim 1, wherein the first coding means performs quadrature transform coding.

6. The image signal coding apparatus according to claim 1, wherein the second coding means performs block truncation coding.

7. An image signal coding apparatus comprising:

block extracting means for extracting a pixel block of m×n pixels from an image signal, where m and n are positive integers;

first coding means for coding the extracted pixel block into variable-length coded data;

second coding means for coding the extracted pixel block into fixed-length coded data of a predetermined code amount;

code amount counting means for counting code word lengths of the variable-length coded data, to determine an intermediate code amount and a code amount of the pixel block;

code amount judging means for comparing the code amount of the pixel block with a first threshold that is larger than the predetermined code amount, and outputting a comparison result as discrimination information;

selecting means for selecting the variable-length coded data when the discrimination information indicates that the code amount of the pixel block is smaller than the first threshold, and selecting the fixed-length coded data when the discrimination information indicates that the code amount of the pixel block is larger than the first threshold;

termination judging means for terminating a coding operation of the first coding means when the intermediate code amount reaches the predetermined code amount, the code amount of the pixel block being smaller than the first threshold; and storing means for storing the selected coded data and the discrimination information in a correlated manner.

* * * * *